(12) United States Patent
Saini et al.

(10) Patent No.: US 7,174,370 B1
(45) Date of Patent: Feb. 6, 2007

(54) SYSTEM AND METHODOLOGY FOR DEVELOPING, INTEGRATING AND MONITORING COMPUTER APPLICATIONS AND PROGRAMS

(76) Inventors: Atul Saini, 16185 Rose Ave., Monte Sereno, CA (US) 95030; Nagesh Vempaty, 3506 Waverley St., Palo Alto, CA (US) 94306; Amit Gupta, A-135, Shyam Park Extension, Sahibabad, District Ghaziabad, U.P. 201 005 (IN); Roger Melen, 12992 Vista Del Valle, Los Altos Hills, CA (US) 94022

( * ) Notice: Subject to any disclaimer, the term of this patent is extended or adjusted under 35 U.S.C. 154(b) by 890 days.

(21) Appl. No.: 10/029,735

(22) Filed: Dec. 21, 2001

Related U.S. Application Data

(60) Provisional application No. 60/284,652, filed on Apr. 17, 2001.

(51) Int. Cl.
*G06F 15/177* (2006.01)
*G06F 15/173* (2006.01)

(52) U.S. Cl. ....................... 709/220; 709/223
(58) Field of Classification Search ............... 709/220, 709/223
See application file for complete search history.

(56) References Cited

U.S. PATENT DOCUMENTS

| | | | | |
|---|---|---|---|---|
| 5,625,823 | A * | 4/1997 | Debenedictis et al. | 717/139 |
| 5,634,010 | A * | 5/1997 | Ciscon et al. | 709/223 |
| 6,092,096 | A * | 7/2000 | Lewis | 709/200 |
| 6,144,984 | A * | 11/2000 | DeBenedictis et al. | 718/106 |
| 7,051,098 | B2 * | 5/2006 | Masters et al. | 709/224 |
| 2002/0147784 | A1 * | 10/2002 | Gold et al. | 709/208 |

* cited by examiner

*Primary Examiner*—David Wiley
*Assistant Examiner*—J Bret Dennison
(74) *Attorney, Agent, or Firm*—Ash Tankha; Of Counsel, Lipton, Weinberger and Husick

(57) ABSTRACT

The present invention provides a system, method and computer program product for developing distributed applications, integrating component programs, integrating enterprise applications and managing change. The invention provides for an infrastructure where component programs that are the computational logic of the distributed application are installed over a network of computing units having controller programs running on each of these computing units. The invention provides for separating the concerns of computation, installation, execution and monitoring of the distributed application in terms of time, space and people involved. This is accomplished as the component programs simply perform the computation task and the communication between the component programs and their monitoring is handled by the controller programs.

10 Claims, 9 Drawing Sheets

SYSTEM AND METHODOLOGY FOR DEVELOPING, INTEGRATING AND MONITORING COMPUTER APPLICATIONS AND PROGRAMS

CROSS-REFERENCE TO PROVISIONAL APPLICATION

This application claims the benefit of U.S. Provisional Application No. 60/284,652, filed on Apr. 17, 2001.

BACKGROUND OF THE INVENTION

1. Field of the Invention

The present invention generally relates to distributed computing. More particularly, the present invention relates to a system, method and computer program for developing and monitoring distributed applications, integrating component programs, integrating enterprise applications and change management.

2. Description of the Related Art

Traditionally, enterprises have employed monolithic computers for performing their computational tasks; these computers had applications that contained the logic for solving different kinds of computational tasks. Such applications, now often referred to as legacy applications, were structured either as a single large program or were split into separate programs (also called component programs) that worked together to perform the assigned task. These applications were usually created for specific hardware and could work only on this hardware.

The advent of Personal Computers (PCs) and the emergence of networking technologies made it possible to connect the monolithic computers to many PCs through a network. Here, the monolithic computer acted as a central server; it had enormous processing power, performed complex computational tasks, and usually provided various results to the PCs. The PCs, in turn, acted as clients and were usually distributed within an organization, an enterprise, a Local Area Network (LAN) or a Wide Area Network (WAN). Various human professionals would then interact with the central server using these PCs. Hence, all the processing was done at the central server, and the PCs—which were at times as simple as screens and keyboards—only performed the role of requesters. This kind of a computing model came to be known as the "client-server model."

As network bandwidth increased and as the processing power and other resources of PCs increased, it quickly became possible for the applications (that were hitherto confined only to a central server) to be assigned to the individual PCs. When such individual applications were deployed on a plurality of networked PCs, a lot of integration issues arose, which were mainly due to the heterogeneous environment wherein such applications were deployed. Typically, such applications were, and in most cases even to this day are, spread across disparate hardware and software systems with different architectures, platforms, communication protocols and languages. This was owing to the fact that most enterprises had created their applications based on the technology of the day, without realizing how these disparate systems would later share information and interoperate. The integration of such applications (deployed across disparate platforms) is now a main concern of most enterprises and organizations.

The problems of integrating applications within an enterprise are now addressed by Enterprise Application Integration (EAI) platforms. EAI platforms provide the wherewithal for the integration of two or more disparate applications operating within an enterprise. EAI platforms have generally been used for the integration of Customer Relations Management (CRM), Supply Chain Management (SCM), Enterprise Resource Planning (ERP) and many other applications of an enterprise. Many companies like Tibco of Palo Alto, Calif., USA; Vitria of San Jose, Calif., USA; WebMethods of Fairfax, Va., USA; and IBM of Armonk, N.Y., USA, provide various kinds of EAI platforms.

The problem of integration has been further exacerbated with the emergence of electronic business (often called e-business). With the emergence of the Internet, and with advances in wired as well as wireless communications, there has been a revolutionary change in business dynamics, and many operational boundaries between enterprises have virtually become non-existent. Further, the emergence of e-business has facilitated business collaborations wherein enterprises exchange real-time product, services and market information with their partners, manufacturers, suppliers, transporters, and customers. Such collaborations place high interoperability and integration needs on most enterprises and it is vital that they integrate their systems with those of others. Some problems of integrating applications across multiple enterprises are being handled today by Business-to-Business (B2B) platforms. Many companies like Plexus of San Jose, Calif., USA; Icomexpress of Nashua, N.H., USA; Ariba of Mountain View, Calif., USA; and IBM of Armonk, N.Y., USA, provide such B2B platforms.

Although the above-mentioned EAI and B2B platforms have proved advantageous in overcoming some integration problems, they suffer from certain shortcomings. These platforms typically specify the workflow and data routes within the application code itself while integrating the different applications. This results in an inflexible integrated application where any modification in the workflow or data routes entails changing the application code itself. Indeed, this is a very tedious process. Further, since data routing is embedded within the application code, any network failure may result in the halting of the integrated application, which in turn, may require re-routing the data as well as recompilation and re-launching of the integrated application. Therefore, EAI and B2B platforms provided by such companies tend to be very rigid and involve a lot of custom programming.

There are many other platforms that provide for integration of applications where the complete workflow and the routing tables are stored in a central server or a central computer. In this scenario, all applications are required to send their data and information to this central server and it is the central server that uses stored routing tables to route this information to other applications, nodes or computers. Thus, there is no direct routing between the applications. Further, any changes to routes or any addition of new routes would require modifications at the centralized server. In addition, all data exchanged between applications needs to go through the central server, thereby, causing this server to become a single point of failure. This type of topological restriction is inefficient and inflexible, and it forces obvious bottlenecks into the distributed system. Clearly, these problems are likely to exacerbate while trying to integrate applications in an enterprise or across several enterprises.

It may be noted that the above problems would also exist in case a large and complex application is broken down into component programs and distributed across multiple computers connected over a network. The problems faced would now apply to the task of integrating the distributed component programs so as to make their conglomeration work as one application, and perform a computing task in a distributed manner. Such a form of computing is known as distributed computing, and even though this field shares a lot of problems with the field of application integration, the two are not to be considered the same. In general, the solutions/platforms available for application integration do not apply for distributed computing, although the concepts/ideas of the solution might find their use in distributed computing and vice versa.

Many companies like United Devices of Austin, Tex., USA and Ubero Inc. build software platforms that attempt to solve complex problems using distributed computing. These companies do not build platforms that help developers create new distributed applications easily; instead, they provide for an agent based platform that efficiently utilizes the unused power of various computers, servers and PCs in a network. Hence, in addition to all the problems mentioned in previous paragraphs, the developer also has to worry about the routing of information between the component programs, monitoring the component programs, handling additions and replacements of the component programs, and other related issues with the software platforms provided by United Devices and Ubero, Inc.

Software infrastructures also exist that aid developers in creating distributed applications; indeed, Aramira Inc. of San Jose, Calif., USA, provides such an infrastructure, that is called Jumping Beans. The distributed applications created using this infrastructure physically "jump" from one machine to another while the application is running. In other words, while the application is running on one computer, it picks itself up and physically moves to another computer on the network and then resumes execution. The software infrastructure provides central control of the distributed application(s) and requires client software to be installed on the participating computers for facilitating receipt of the distributed application and also for monitoring and security purposes. However, the Jumping Beans infrastructure has certain inherent shortcomings. Once an application has been launched, there is no control over the routing information. Therefore, after launching the distributed application it is not possible to change the order in which the application shall jump across various computers. Indeed, if the order has to be changed, then the application would have to be stopped and the routes have to be changed before re-launching it. Moreover, the monitoring and controlling of the distributed applications have to be done using a central server.

U.S. Pat. Nos. 5.625,823 and 6,144,984, have been issued to Eric DeBenedictis and Steve Johnson. These patents are titled "A method and apparatus for Controlling Connected Computers without programming". These patents outline a process for creating, maintaining and executing network applications.

In the process outlined by these patents, applications are created using tasks as the building blocks. These tasks are created using a Graphical User Interface (GUI) by typing in the code of a program that is to be executed. The IP address or the name of the computer on which the program is to be executed is also typed in this GUI. This results in the creation of a task, represented by an icon, which is then stored in a palette. A distributed application is then created by dragging icons from this palette and dropping them on a "screen." The data routes between the icons are then created by drawing "directed line segments" (also called "arcs") among them. Once the routes are drawn out, the application can be executed. Upon execution, the computer to which the first task is assigned receives the entire application and executes the task. The output that results from the execution of this first task along with the entire application is carried to the computer to which the second task is assigned; the directed line segment from the first task (or icon) points to the second task (or the second icon). This process is continued until the whole application is executed. Thus, the process of deploying the application as tasks is combined with the process of executing the tasks.

The above-mentioned system has certain inherent shortcomings. First, this system is wholly dependant on the GUI for composing a distributed application since linking icons in the GUI is the only way to develop the application. Second, as the code has to be typed in the GUI to create a task, no pre-built or off-the-shelf application can be easily used in this system. Third, the system necessarily requires each task to be created and launched from within its environment and these tasks cannot be re-used by similar applications. Fourth, it is difficult to change the routes or tasks at run time, since any change would entail re-compiling or re-transmitting the entire application. Fifth, as the name of computer (or its IP address) is embedded into the task itself, these tasks have to be aware of the underlying communication fabric that complicates the creation and modification of the tasks. Sixth, the system uses the types of tasks as a failsafe, which results in a tightly coupled system. Finally, the process of transferring tasks to execute the application from one node to another at run time consumes a lot of network bandwidth. Because of the aforementioned shortcomings, this system does not allow pre-built component programs or applications to be easily integrated into the system.

The preceding discussion reveals that the abovementioned system combines the processes of deployment, computation and communication within the tasks, and thus makes the resulting distributed application very rigid. Moreover, any change in the connections (or "routes" between tasks) requires the application to be stopped followed by manual changes using the GUI. Specifically, the abovementioned system is unable to support applications with a dynamic workflow.

It may thus be noted that although work has been done in the area of developing distributed applications; the prior art does not address the problem of developing distributed application easily. Prior art also does not provide for dynamically changing the distributed application to meet many real world requirements.

Therefore, in light of the abovementioned drawbacks, there is a need for a system, method and computer program product for developing distributed applications easily, that would provide for separation of tasks of deployment, computation, communication and monitoring in terms of time, space and people involved, thereby minimizing the impact of change in one stage on the other and allowing for dynamic changes to the application, as desired. There is also a need for a system, method and computer program product that addresses integration of applications both within and across enterprises.

SUMMARY OF THE INVENTION

An object of the present invention is to provide a method, system and computer program product for using component programs that represent a variety of services as the building blocks for building a distributed application.

Another object of the present invention is to provide a method, system and computer program product that enables users to develop integrated applications, using enterprise applications that are spread in disparate software and hardware environments within as well as across the enterprises.

A further object of the present invention is to provide a method, system and computer program product that enables users to develop distributed applications using pre-built as well as off the shelf component programs.

Yet another object of the present invention to provide a method, system and computer program product that allows users to specify the routing of data between the distributed component programs and applications externally such that the component programs are completely oblivious to the underlying fabric of communication between them.

Yet another object of the present invention to provide a method, system and computer program product that enables users to perform distributed and run time monitoring of the distributed application.

Yet another object of the present invention is to provide a method, system and computer program product that enables users to perform real time debugging, logging and tracing of the component programs of the distributed application while the component programs are running.

Yet another object of the present invention is to provide a method, system and computer program product that enables users to manage change within the distributed applications while applications or component programs are running.

Yet another object of the present invention is to provide a method, system and computer program product that enables any addition or hot swapping of component programs while the application is running.

Yet another object of the present invention is to provide a method, system and computer program product that allows users to create distributed applications independent of the various security details and protocols of the underlying network.

Yet another object of the present invention is to provide a method, system and computer program product that enables users to compose a distributed application by entering the relevant information externally in a data store.

Yet another object of the present invention is to provide a method, system and computer program product that enables users who do not have any programming knowledge to compose distributed applications using a Graphical User Interface.

Yet another object of the present invention is to provide a method, system and computer program product that enables separating the tasks of installation, computation, communication and monitoring of the distributed applications and component programs in terms of time, space and people involved.

Yet another object of the present invention is to provide a system, method and computer program product that ensures that the component programs that form part of the distributed application are installed and launched and ready on their respective nodes to carry out the execution of the distributed application later.

Yet another object of the present invention is to provide for a system, method and computer program product that enables the component programs installed on a computing node in a network to be launched from any computing node in the network.

The present invention is a system, method and computer program product that comprises a plurality of controller programs that provide an infrastructure on which distributed applications can be developed or enterprise applications may be integrated. The controller programs are daemon programs running on each of a plurality of computing nodes having component programs installed on these computing nodes. The controller programs interact with the component programs that have the computational logic embedded for performing a given processing task on data streams presented to it. The controller programs further interact amongst themselves to pass the data streams from one component program to another, based on externally supplied routing information, to make the conglomeration of component programs work as one application, and perform a computing task in a distributed manner. Thus, communication is managed by the controller programs external to the component programs. The component programs are oblivious to the communication.

The distributed application can be composed externally in a data store by specifying the component programs that make up the application, the communication routes between these component programs and the nodes on which the component programs would be run. A Graphical User Interface facilitates composing of a distributed application even by a non-programmer. Alternatively, a distributed application may be composed by directly entering the component program and routing details into the data store.

When the distributed application has been composed the infrastructure ensures that all the component programs that form part of the application have been installed on the appropriate nodes and are ready to launch whenever the controller program gives a launch command. The controller programs then launch their respective component programs, if the component programs are not already running. The component programs start executing the application once they receive input data on their input ports. The controller programs pass data from one component program to another based on the routing information disseminated to them from the data store in which the distributed application has been composed. The component programs present on each node are only concerned with taking the data presented by the controller programs on their input ports, processing the data and writing the results to their output ports. The controller programs provide an infrastructure for the component programs to interact with each other thus aiding in the development of distributed applications and integrating enterprise applications.

BRIEF DESCRIPTION OF THE DRAWINGS

The preferred embodiments of the present invention will hereinafter be described in conjunction with the appended drawings provided to illustrate and not to limit the invention where like designations denote like elements, and in which.

DETAILED DESCRIPTION OF THE PREFERRED EMBODIMENT

The present invention is a method, system and computer program product for developing and monitoring distributed applications, integrating component programs, integrating enterprise applications and change management. The present invention provides for separation of the tasks of computation, communication, deployment and monitoring in terms of time, space and people involved, for the purpose of developing distributed applications. The present invention provides a Services Operating Platform (SOP) for developing distributed applications from component programs that represent a variety of services.

Figure 1:
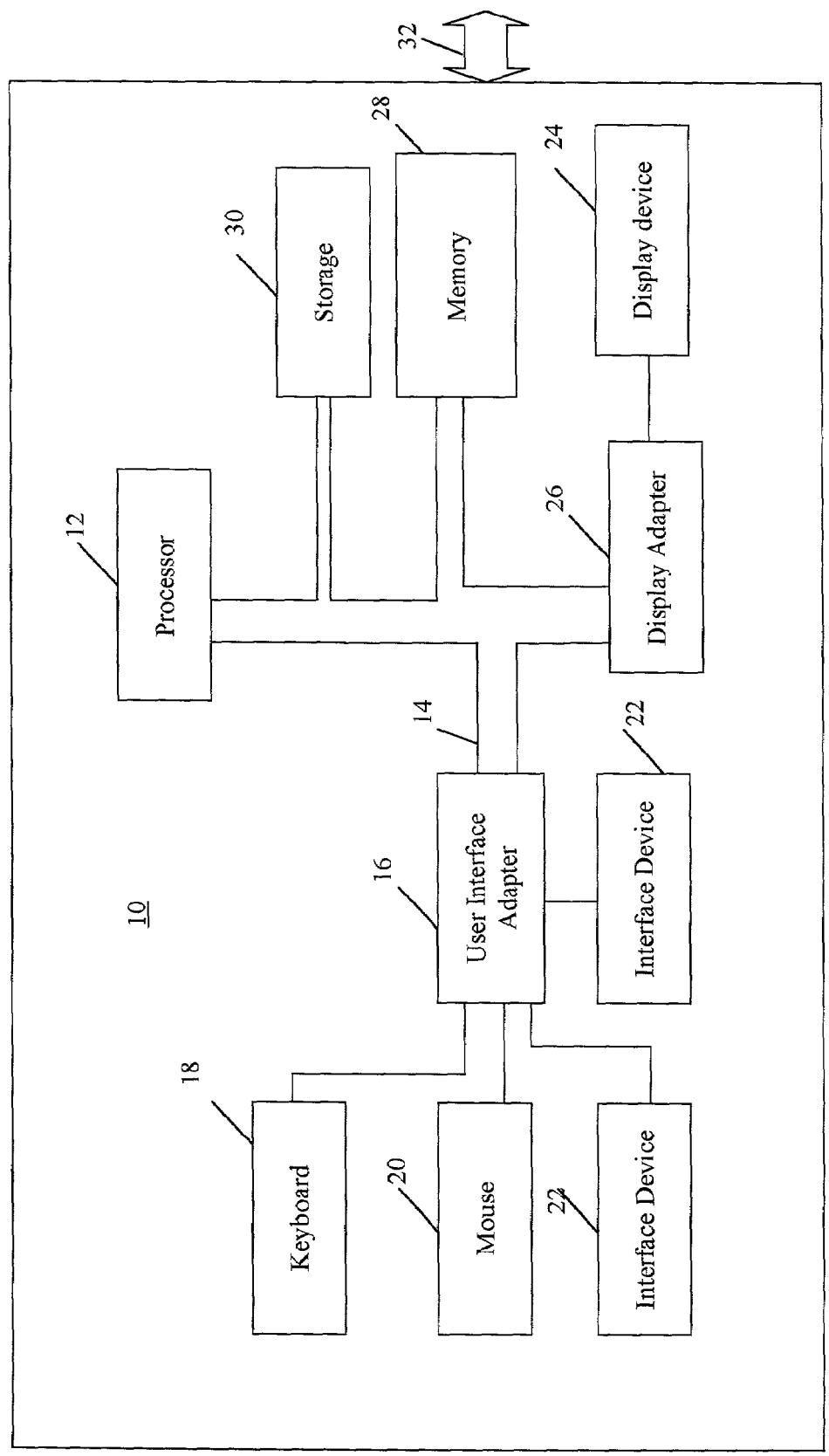
FIG. 1 is a block diagram of a computing node's hardware environment in which the present invention may be practiced.

FIG. 1 illustrates a representative computing node's hardware environment in which the present invention may be practiced. The environment of FIG. 1 comprises a representative computing node 10, such as a personal computer, including related peripheral devices. The computing node 10 includes a microprocessor 12 and a bus 14 employed to connect and enable communication between the microprocessor 12 and other hardware devices like memory, input and output devices of the computing node 10 in accordance with known techniques. The computing node 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The computing node 10 communicates via a communications channel 32 with other computing nodes or networks of computing nodes. The computing node 10 may be associated with such other computing nodes in a local area network (LAN) or a wide area network (WAN), or the computing node 10 can be a client in a client/server arrangement with another computing node. All of these configurations, as well as the appropriate communications hardware and software, are known in the art.

Figure 2:
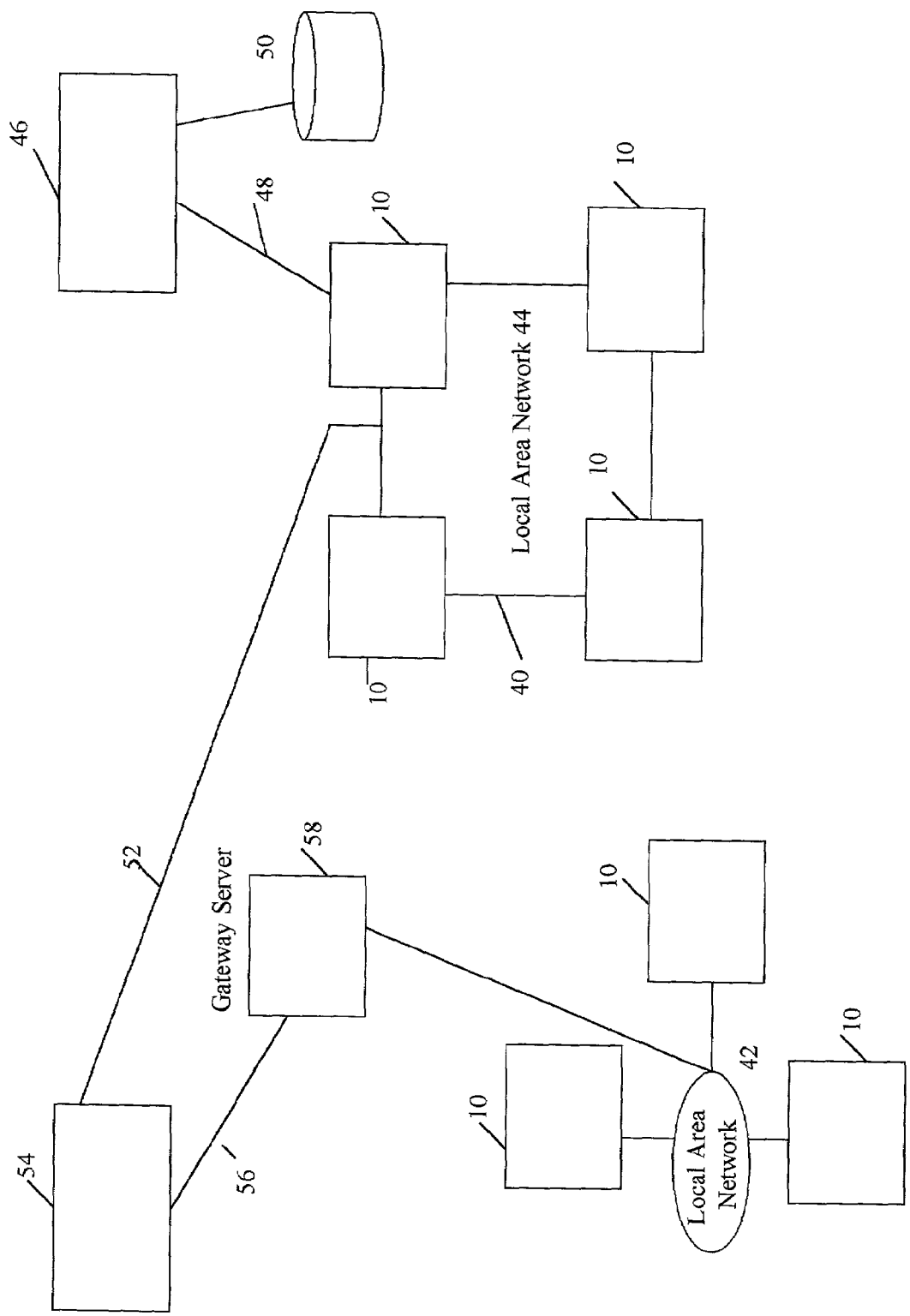
FIG. 2 is a diagram of a networked computing environment in which the present invention may be practiced.

FIG. 2 illustrates an exemplary environment of a data processing network 40 in which the present invention may be practiced. The data processing network 40 includes a plurality of individual networks, including LANs 42 and 44, each of which includes a plurality of individual computing nodes 10. Alternatively, as those skilled in the art will appreciate, a LAN may comprise a plurality of intelligent computing nodes coupled to a host processor.

Still referring to FIG. 2, the data processing network 40 may also include multiple mainframe computing nodes, such as a mainframe-computing node 46, which may be preferably coupled to the LAN 44 by means of a communications link 48.

The mainframe-computing node 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computing node or intelligent computing node, which serves to link the LAN 42 to the LAN 44.

Those skilled in the art will appreciate that the mainframe computing node 46 may be located a great geographic distance from the LAN 44, and similarly, the LAN 44 may be located a substantial distance from the LAN 42 and be connected by a WAN.

Software programming code, which embodies the present invention, is typically accessed by the microprocessor 12 of the computing node 10 from long-term storage media 30 of some type, such as a CD-ROM drive or hard drive. In a client-server environment, such software programming code may be stored with storage associated with a server. The software programming code may be embodied on any of a variety of known media for use with a data processing system, such as a diskette, hard drive, or CD-ROM. The code may be distributed on such media, or may be distributed to users from the memory or storage of one computing system over a network of some type to other computing systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The preferred embodiments of the present invention will now be discussed with reference to the following figures. In the preferred embodiments, the present invention is implemented as a computer software program for developing and monitoring distributed applications, integrating component programs, integrating enterprise applications and managing change. The software may execute on the user's computing node or on a remote computing node that may be connected to the user's computing node through a LAN or a WAN that is part of a network owned or managed internally within the user's company, or the connection may be made through the Internet using an ISP. What is common to all applicable environments is that the user accesses a computer network, such as the Internet, through his/her computer, thereby accessing the computer software that embodies the invention.

Figure 3:
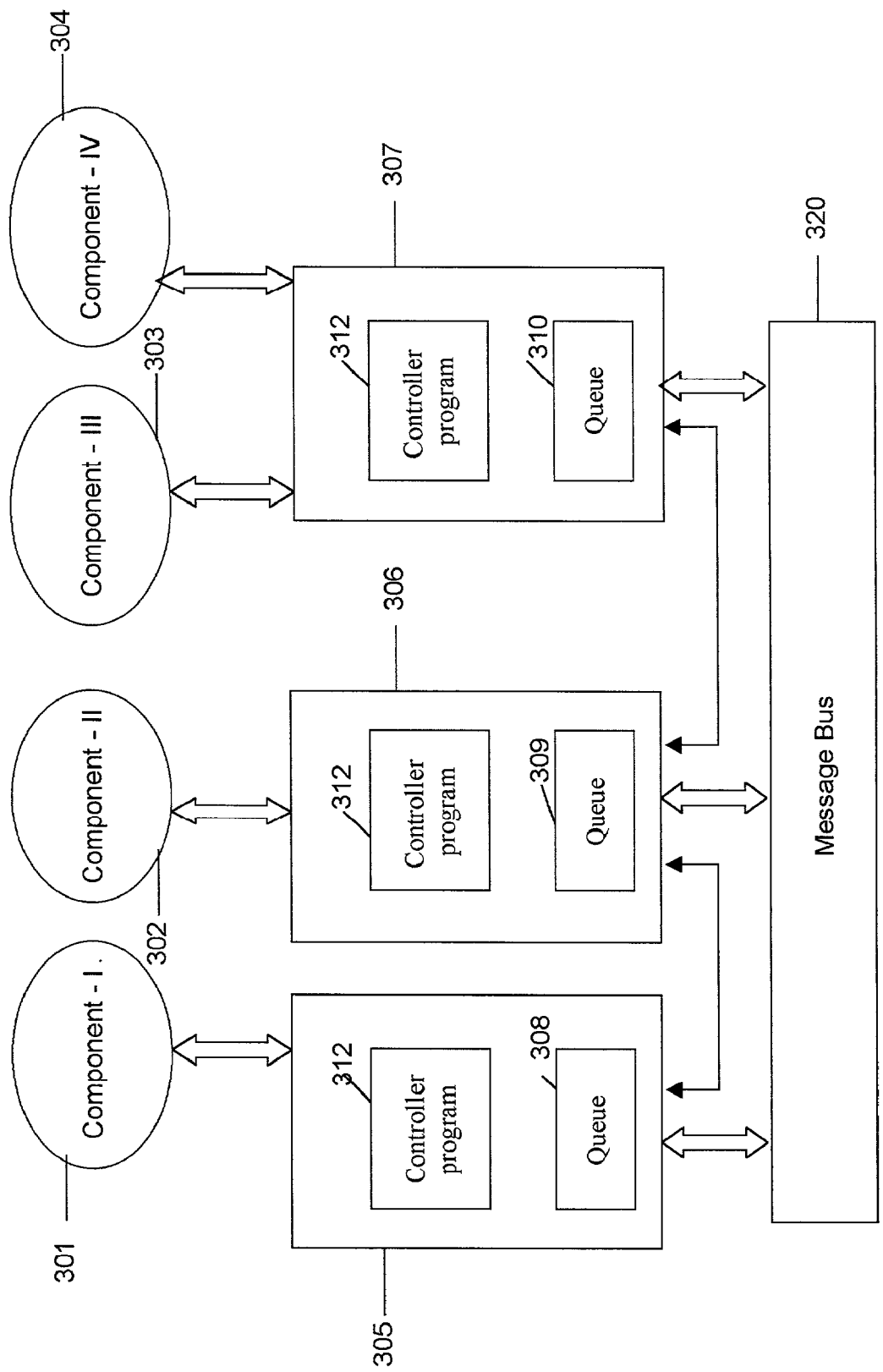
FIG. 3 is a block diagram that illustrates the cooperation amongst elements of the system in accordance with the present invention.

FIG. 3 is a block diagram that illustrates the cooperation amongst elements of the system in accordance with the preferred embodiment of the present invention. The invention provides an platform for component program-based development and execution of distributed applications.

Component programs 301, 302, 303 and 304 are high-level software programs that represent a variety of services—for example, chat applications, CRM applications, ERP applications, databases, adapters, web servers, web services, etc. The components may be developed using various architectures like Enterprise Java Beans (EJB's), Component Object Model (COM), .NET, web services and may be written in a variety of programming languages like XML, Java, Perl, Visual Basic, C, C++ and C#, all of which are supported by the invention.

The component programs are customized and stored on computing nodes in a network as a component program file in the extensible mark-up language (XML) format. Component program 301 and component program 302 are customized and stored on computing node 305 and computing node 306 respectively. Similarly component programs 303 and 304 are customized and stored on computing node 307. All the computing nodes 305, 306, 307 are connected in a network. All the component programs have input and output ports on which data is sent and received. There may be any number of input and output ports of a given component program.

Each component program typically, but not necessarily, runs as a separate process and is controlled by a controller program 312.

Controller programs 312 are daemon programs that run on one or more computing nodes of a network in a peer-to-peer mode. Each controller program 312 interacts with the component programs that are either installed and/or running on its node or on a different node using Application Programming Interfaces (APIs) or simply by passing XML messages or binary streams and objects. The controller programs 312, in turn, communicate with each other using message queues 308, 309 and 310 that are implemented within each controller program. The controller programs 312 exchange control information with each other over an event based message bus 320, using these message queues.

The component programs are registered with one or more computing nodes in the network making them available on multiple computing nodes, for composing a distributed application. In an alternative embodiment, the component programs stored on a particular computing node are registered with the controller program of the computing node.

To compose a distributed application, the developer has to specify in a data store, the component programs that make up the application, the communication routes between these component programs, and the computing nodes on which the component programs would be run. This data store, would then, essentially represent the distributed application. The developer can also integrate external applications like web servers, web services, external enterprise applications, and external databases with the component programs running on the platform, by specifying communication routes between the external application and such component programs. The routes represent the directional flow of data between the component programs when the application is run. Routes play a key role, as they are the connections that carry data from an output port of a given component program to an input port of another component program. Routes always originate from the output port of a component program and end on an input port of another component program.

In a preferred embodiment of the present invention, a user may use a Graphical User Interface (GUI) for composing the application by choosing the component programs and drawing the routes between them, which would then be stored in the above-mentioned data store in ASCII or in the Extensible Markup Language (XML).

When the distributed application has been composed the platform provides for carrying on a connectivity and resource check. This ensures that all the component programs that form part of the application have been installed on the appropriate computing nodes and are ready to launch whenever a controller program gives a launch command. The controller program of the computing node that has access to the composed application disseminates a launch command and the routing information for the other controller programs. The respective controller programs then launch their respective component programs, if these programs are not already running. The component programs once launched become ready to receive input and process data. The component program once launched runs continuously and remains connected to the controller program to receive data.

In an alternative embodiment the controller program triggers the execution of one or more component programs when there is some input for the component program, and the component program after having performed the required computation task terminates. The component programs present on each node are only concerned with taking the data presented by the controller programs on their input ports, processing the data and writing the results to their output ports. The controller programs simply provide an infrastructure for the component programs to interact with each other. Each controller program picks the data from its associated component program's output ports and passes the same to the controller program associated with the next component program, on the basis of the routing information stored with it. As stated earlier, there may be a plurality of input ports as well as output ports for a component program. Further, there may be a plurality of component programs that are executed after a given component writes data to its output ports. This passing of data information between the controller programs is either done directly or through the message bus 320. Thus, the controller programs pass data from one component program to another and make the conglomeration of component programs work as one application. The routing of information is thus carried external to the component programs. This enables decoupling of the computation by the component programs from the communication between them. The component programs merely perform the computational logic and are completely oblivious to their participation in the distributed application. Thus the invention also supports the use of pre-built component programs as well as externally developed component programs.

The controller programs also provide for change management within the application. It is possible to change the data routes on the fly, without stopping the application, as the controller programs can simply implement the new routes on the fly without having to stop the running component programs. Further, it is possible to add, hot-swap or remove component programs while the application is running. Again, the presence of the controller programs rules out the need for stopping and restarting the running application.

All changes to the application are reflected throughout the application while the application is still running. It may be noted that the infrastructure also provides for incrementally composing an application. This allows an application or a workflow to be instantiated within a "null" or blank data store and incrementally updated as new component programs are added which become a part of the application.

The controller programs further include capabilities for tracing, logging and monitoring their respective component programs. Each controller program can query the other controller programs to monitor its component programs' status, and reply with the information. Thus it is possible to monitor the distributed application from any of the participating computing nodes. This leads to a distributed form of application monitoring.

The controller programs also include various other features—for example, handling security issues, and scheduling and launching of component programs at specific times. Moreover, as each controller program has the whole view of the distributed application, they are able to remotely launch component programs on other computing nodes, as and when required. In case, any of the controller programs fail, the other's can still continue with their operations, as the other controller programs are not affected by this failure.

Thus, it may be seen that the architecture adopted by the present invention of having one or more component programs on each node of a network and controlling these component programs by a controller programs helps in attaining the objectives of developing and monitoring distributed applications, integrating component programs, integrating enterprise applications and change management in a very simplified and flexible manner.

Figure 4:
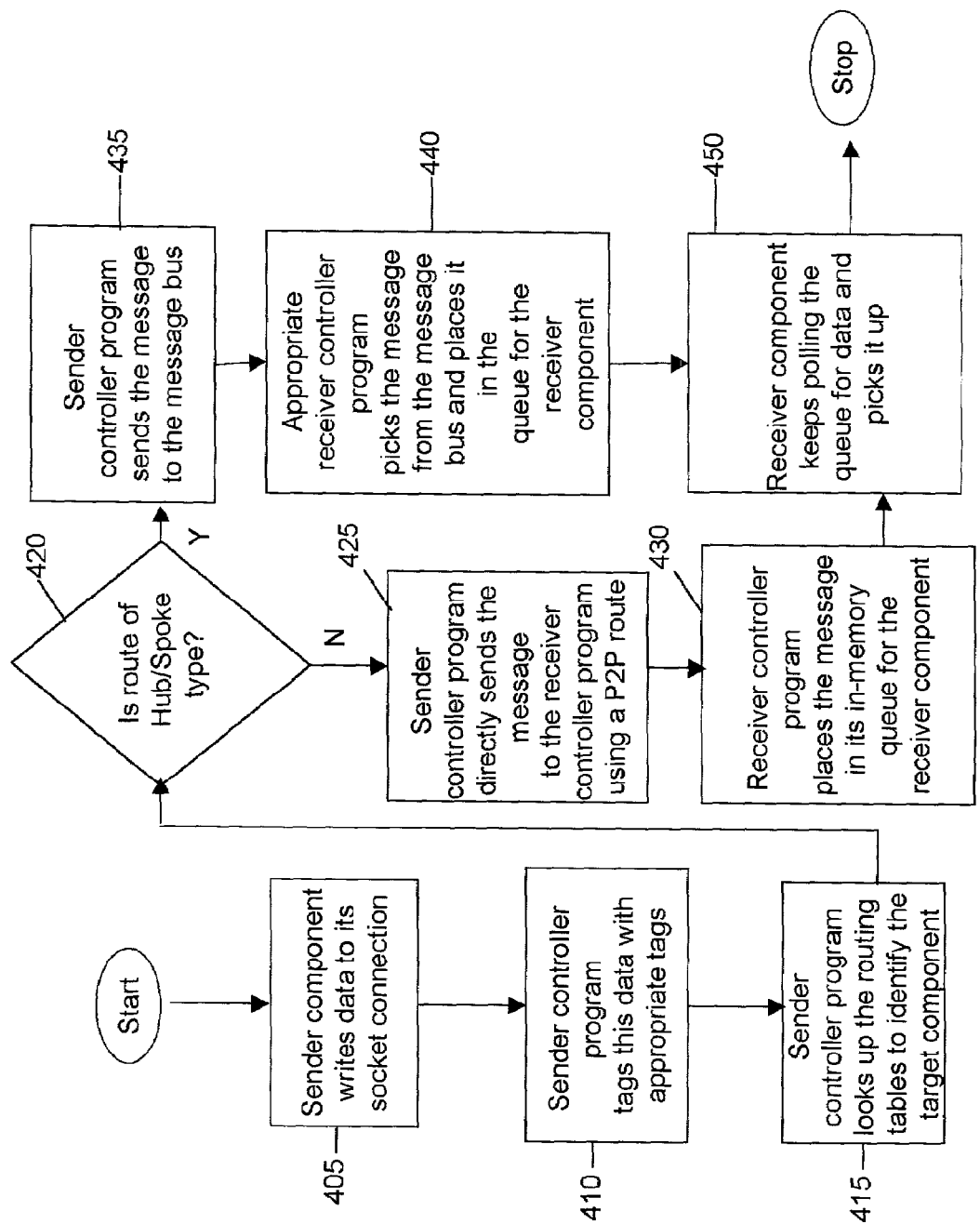
FIG. 4 is a flowchart that illustrates the communication between the component programs and the controller programs as well as between the controller programs in accordance with a preferred embodiment of the present invention.

FIG. 4 is a flowchart that illustrates the communication between the component programs and the controller programs as well as between the controller programs in accordance with the preferred embodiment of the present invention. The communication process can be divided in three steps: sending of information from the sending component program to its associated controller program, routing of information from this controller program to the receiver controller program, and collecting of information from the receiver controller program by the receiver component program.

The sending component program after performing its processing task writes the processed data onto a socket connection 405 established with its respective controller program. This socket connection may be created using a networking transport, such as TCP, HTTP, SSL, HTTPS and other such protocols all of which are supported by the invention. In an alternative embodiment, the component programs write their data to their respective controller programs using direct Application Programming Interface calls. In yet another embodiment, Inter Process Communication (IPC) mechanisms like Unix Pipes can be used for communication between the component program and the controller program.

The sender controller program tags the data 410 that it has received from the component program installed on its node to form a "message". These tags contain information identifying the component program that sent the data along with the output port of the component program that was used to send the data to the controller program and also the larger distributed application with which the message is associated. The sender controller program looks up its routing tables and identifies the destination component program(s) to which the data is to be sent 415.

The sender component programs have no idea that their data is being routed to another component program. The controller programs are responsible for distributing the data received from the component programs. The message routes specified between the component programs are only known to the controller programs as this routing information is stored in their respective routing tables. The controller program adds tags to the message being sent specifying the destination component program by referring to this routing table. These tags facilitate the component programs to participate in a number of applications at the same time.

In case the message is specified to be sent through a Hub/Spoke mode 420, the sender controller program sends the message to a message bus 435. The appropriate receiver controller program(s) picks the message for its component program(s) from the message bus and places it in the memory based queue corresponding to the receiver component program 440. Receiver controller programs only pick up messages 450 that are intended for the component program(s) installed on its node, and not any other message. The aforementioned tags that are present on each message facilitate this.

In case the message is specified to be sent through a peer-to-peer route, the sender controller program sends the message directly to the receiver controller program 425 over the chosen transport such as TCP, HTTP, HTTPS, or an SSL connection. As a further optimization, in case a connection/session already exists, it can be re-used, otherwise a new one can be created. To ensure guaranteed delivery of messages, the messages may be tagged to be persistent so that in case of any fault the data is not lost and is stored in the local queue of the sender controller program.

Once the receiver controller program receives the data, it is stored in the memory queue 430 that is implemented within the receiver controller program. Every memory queue is specific to a receiver component program and the larger application. Each receiver component program keeps polling its respective queue to collect data 450 from the controller program. This polling is done through socket connections established with the controller program. It is also possible that the component programs perform polling through direct API calls. The data once received on the component program is passed on the appropriate input channel through callbacks established by it. In an alternative embodiment of the present invention, it is also possible for the component programs to register callbacks with the controller programs for the purposes of scalability.

Figure 5:
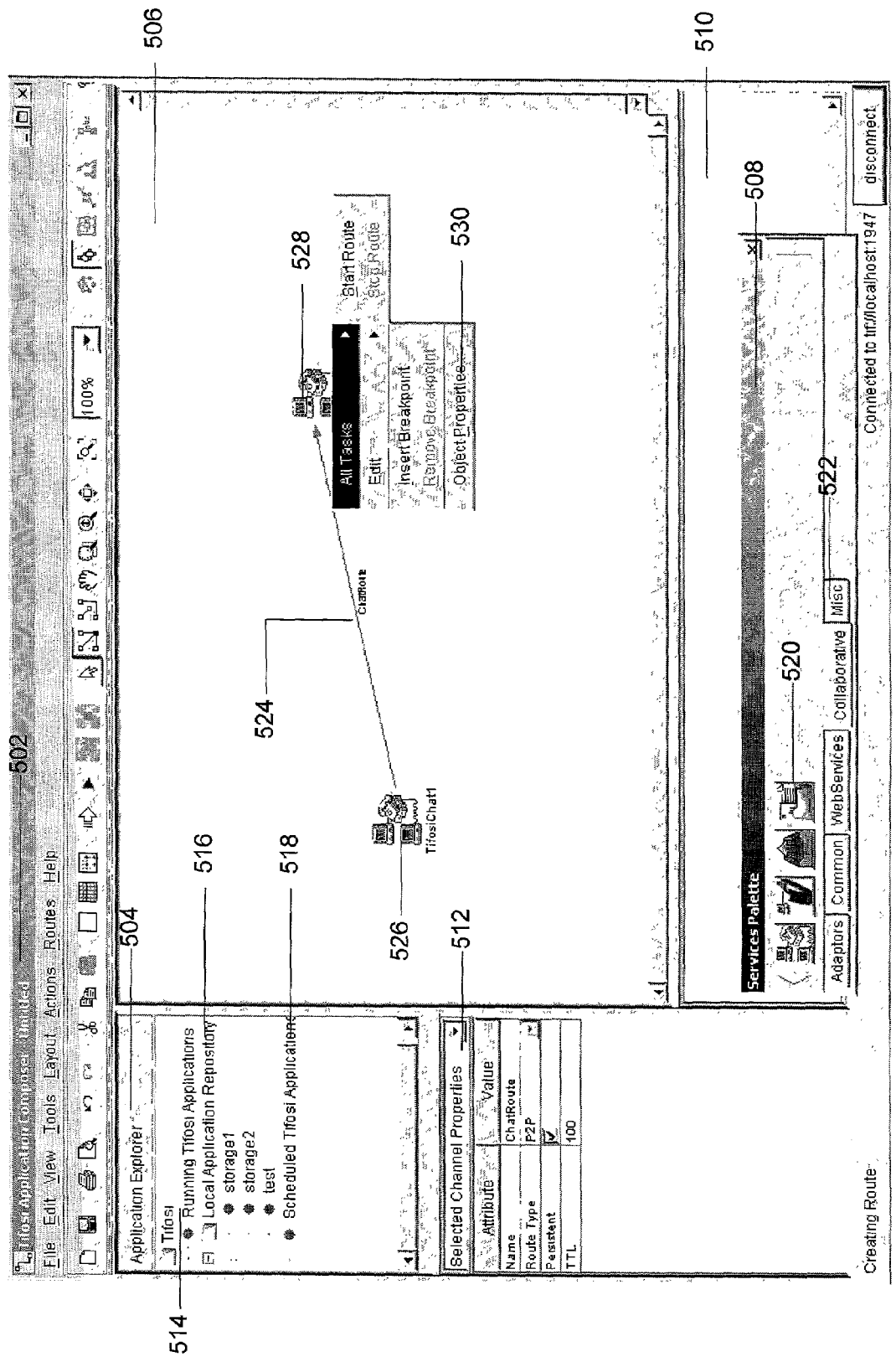
FIG. 5 is screen shot of a window that allows the user to compose a distributed chat application using a GUI in accordance with a preferred embodiment of the present invention.

FIG. 5 is a screen shot that illustrates the composition of a distributed chat application using a GUI in accordance with the preferred embodiment of the present invention. In a preferred embodiment, the application developer need not have any programming knowledge and can compose distributed applications using an "Application Composer" 502 GUI. This GUI 502 represents the application as a graph, where the component programs are represented as nodes 526 and 528 and the message routes are represented as arcs 524. The application functionality is thus represented using visual component programs that are connected to form the logical flow of data. The various parts of the "Application Composer" GUI 502 are briefly discussed below, and then the composition of a distributed application using the GUI is illustrated with a "chat application" example.

The "Application Composer" GUI 502 is divided into various User Interface (UI) panels: Application Explorer 504, Work Area 506, Services Palette 508, Messages Panel 510 and the Tools Panel 512.

The "Application Explorer" 504 is an explorer for navigating between applications. It employs a tree view control for enabling ease of navigation. In the referred figure, the "Running Application" 514 panel lists out all the applications that are currently running on the platform; while the "Local Application Repository" 516 panel lists all the previously composed applications that have been saved on the local computing node. Further, the "Scheduled Applications" 518 control panel lists out the tasks that are to be performed on regular basis. Elements in this control panel would include tasks like regular backups of huge data, data synchronization tasks, regressive testing requirements etc. Using the "Application Explorer" 504, the developer is easily able to select any of the running or local applications and view their properties or change or terminate the same.

The "Services Palette" 508 is the floating tool palette that displays all the component programs as icons 520. All the registered component programs are represented as icons, and get stored in the "Services palette" 508. This palette 508 has many tabs on it and each tab contains the component programs grouped together by category. Component programs in a category are similar. For example, as shown in the referred figure, the tab 522 labelled "Collaborative" contains icons 502 representing a chat component program, an SMS messenger, a POP mail reader and a TEXT display. A new component program can also be added to the palette 508 after registration. It is these component programs, represented as icons, which would be used as the building blocks of the distributed application.

The "Work Area" 506 is the application composition area. Applications are composed on this area by dragging and dropping the icons 520 from the services palette 508 and drawing arcs 524 between them to define the message routes.

The "Message Panel" 510 window displays all errors/warning messages that are generated while working with the composer GUI 502. This window is particularly useful while determining the behaviour of an application due to the fact that messages are displayed in the panel at the time of compiling or executing an application.

The "Application Composer" GUI 502 provides for other utility features that aid the application developer in quickly composing distributed applications. These include copy/paste, grid control, layout control, zooming, file open/save/print, undo/redo and online help.

The various steps involved in creating a "chat application", using the above-mentioned "Application Composer" GUI 502 are discussed below, for exemplary purposes. The first step of composing the chat application is to choose the appropriate component programs (represented as icons) for building the chat application. In this particular example, a "chat component program" that is already present in the "Services Palette" 508 is chosen as the application building block.

The "chat component program" has an input and an output port, and also has a UI to interact with the user. The UI has a text box with a scrollbar for scrolling the text present therein. The only function performed by the "chat component program" is to take the text presented on its input port, and write it to the UI and the output port.

To compose a one way "chat application," the developer drags the "chat component program" to the "Work Area" twice. The two icons would essentially represent two different instances 526 and 528 of the same chat component program. In general, any component program can have several instances in an application. Each instance of a component program represents a run-time reference/object of the component program. Component program instance 526 and Component program instance 528 are thus two instances of the chat component program that are dragged and dropped on the "Work Area" 506. The arc 524 connecting the output port of Component program instance 526 to the input port of Component program instance 528 is then drawn in the "Work Area" 506 to represent the message route between Component program instance 526 and Component program instance 528. It may be noted that the arc 524 (and hence, the message route) is uni-directional, and thus the flow of data is only from Component program 526 to Component program 528.

The attributes of above-mentioned message route are specifiable by right clicking the arc 524, which pops up a property window in the "Tools Panel" 512. Using the "Tools Panel" 512, a developer can specify a name for the drawn route (represented by the "Name" property). The developer can also chose a route type (represented by the "Route Type" property)—i.e. a Point-to-Point route or a hub/spoke route. In a hub/spoke route, the data is routed between the controller programs using the message bus, while in a Point-to-Point route the data routing is direct. The developer is also able to set the "Persistent" property. When the "Persistent" property is set to true, the messages sent over the route are logged on to the memory system of the sending controller program, thus adding a level of fault tolerance to the route. In case the receiving component programs are down, this ensures that the messages are not lost. Lastly, the developer can also set the "TTL" property, which specifies the Time-To-Live value for the messages flowing over the route.

This process completes the specification of the communication in the one-way chat application. Thus, simple dragging and dropping of "chat component program" icons on the "Work-Area" 506 can easily lead to composing of a "chat application".

To make this application a two-way "chat application," an arc can be drawn connecting the output port of Component program 526 to the input port of Component program 528, at any later stage, even after the one-way "chat application" has been installed and is executing. This illustrates that the communication paths may be changed much later, without affecting the running component programs.

The "Tools Panel" 512 also lets the developer specify properties pertaining to the execution of the component program instances. The various component program properties that can be specified by the user in the "Tools Panel" are discussed herein. The name property represents the component program instance name. This is a user-defined name for the component program taking part in this application. The node-name property represents the computing node or the IP address on which the selected component program is to be launched on the network. Further, the user can specify a ComponentGUID, which is a display only property that is set during component program registration. It represents a unique identification code for each component program, which aids in keeping track of the various component programs.

The user can specify whether the component program instance is to be run in persistent mode or not. In case the mode is persistent, the controller program automatically re-launches the component program instance each time it is halted for any unforeseen reason. The user can also specify whether the controller program launches its component program instance as an in-memory thread or as a separate process. In case the component program instance is to be launched as an "in-memory thread", the communication between the component program instance and the controller program becomes local to the controller program and the system resources are not used; this helps in saving the precious system resources. The user may further specify 'isDelayedLaunch' property that decides the launching properties of a component program instance. In case the is DelayedLaunch property is set to true, the component program instance will not be launched until it receives a message on one of its input ports. On the other hand, if the property is set to false, the component program instance would be launched at the application launch itself.

The "Tools Panel" 512 further can be used by the developer to specify various other properties for any chosen component program instance. For instance, a developer may specify an Email and USER property to represent the email-id and user name of the user who owns the component program instance. These properties are used during component program instance launch for security purposes and authentication. Lastly, the show_debug_frame decides whether a "trace window" pops up when the component program instance is launched. The "trace window" gives information that aids in run time monitoring and debugging of the component program instance.

As discussed previously the one-way "chat application" composed may later be made into a two-way "chat application," by connecting the output of component program instance 526 to component program instance 528. This two-way path may be specified much later with out affecting the running one-way "chat application." It maybe even be noted that the NodeName property of the two "chat component program" instances maybe changed at the time of installation or even later at run time. Further, the "Route Type" property may also be changed at run time as desired—the running application does not have to be stopped, and no reprogramming of any kind is necessary.

Thus, it may be seen that no programming knowledge is required to compose distributed applications using the "Application Composer" GUI 502. Applications are composed simply by dragging and dropping component programs from the "Services Palette" 508 onto the "Work Area" 506. Further, creating arcs between the component programs easily defines the communication flow between the component programs, thus simplifying the process of composing an application substantially.

The infrastructure also allows for inter-application communication i.e. a component program "Chat" launched as part of an application "APP_1" can communicate with a component program "Chat2" launched as part of "APP_2". Therefore if "Chat2" of "APP_2" is already running, when APP_1" is launched the "Chat2" is specified as a manual launch mode so that the internal routing tables are filled to establish routes among the two component programs. A representation of this "Chat2" component program, called a component program proxy is dragged onto the work area of the GUI where "APP_1" has been composed. This component program proxy represents the "Chat2" component program and all its associated workflows. Therefore, applications having a complex workflow can be split into two or more different workflows and combined together with the help of these proxy representations to integrate two distinct applications.

Figure 6:
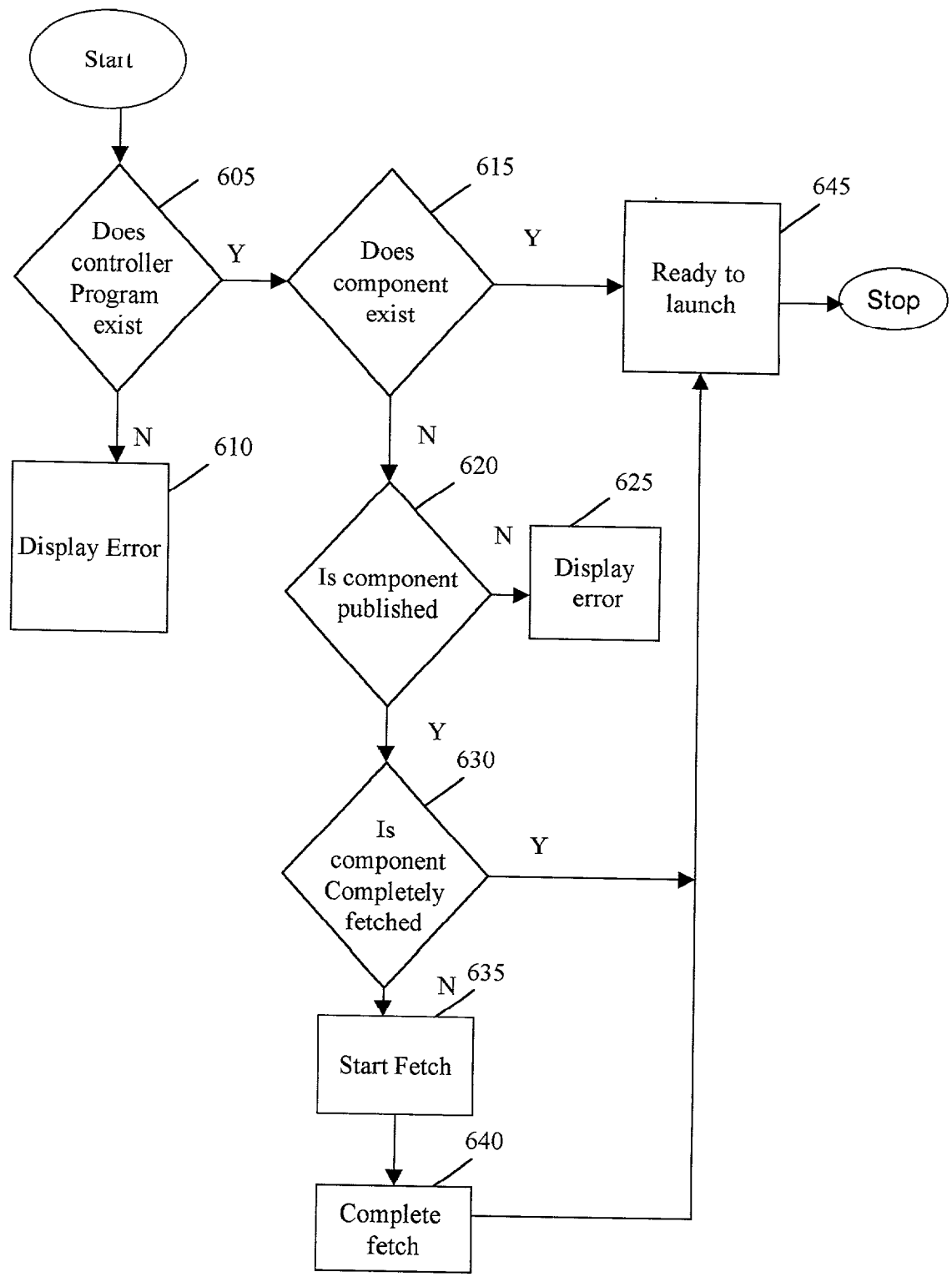
FIG. 6 is a flow chart that illustrates the connectivity and resource check implemented within the infrastructure of the present invention.

FIG. 6 is a flow chart that illustrates the connectivity and resource check implemented within the platform. The connectivity and resource check ensures that the component programs, the properties of the component program configured in the Component program file with regard to the local and global resources to be made available to the component programs, and the controller programs are all in place for the application to be executed.

The platform provides for checking whether a controller program is running 605 on the computing node where a component program has been specified to be installed while composing the application. If the controller program is not running on the afore-mentioned node then an error is displayed 610.

If the controller program is present then the platform provides for checking whether the component program specified to be installed on this computing node is present on it 615. If the component program and controller program are both present on the node on which the component program is specified to be run, then the component program is ready to launch 645. This means that the component program is now in place to instantiate whenever a launch command is received by it from the controller program.

In case the component program is not present on the node then the installation of the component program is invoked wherein it is checked whether the component program has been published to be available throughout the network 620, or else an error is displayed 625. In the preferred embodiment, the component program file is transferred through the message bus using the File Transfer Protocol (FTP). The platform provides for API's that publish and fetch the component program file from the message bus. In case the component program is published the infrastructure provides for fetching of the component program and checking if the component program is completely fetched 630. In case there is some breakdown before the component program has been completely fetched the API's provided in the platform resume from the last fetch that was interrupted 635. The installation is completed 640 when the whole file and resources have been fetched from the message bus. In an alternative embodiment the component program file is transferred directly from peer to peer. Once the component program is completely fetched, it is ready to be launched 645.

Figure 7:
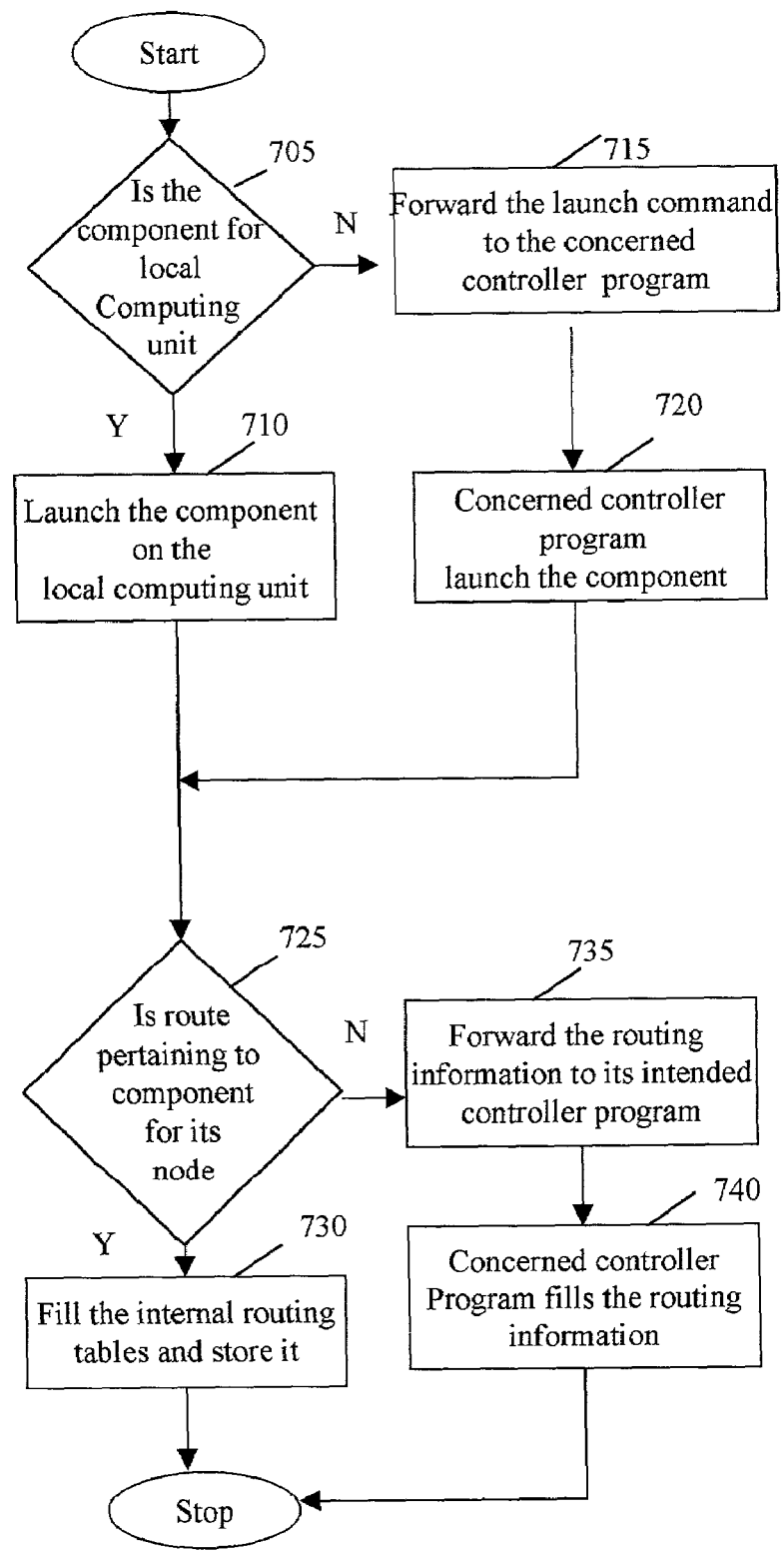
FIG. 7 is a flowchart that illustrates the process of launching of component programs and disseminating routing information in accordance with the present invention.

FIG. 7 is a flowchart that illustrates the process of launching of component programs and storing of routing information by the controller programs within the platform provided by the present invention.

After the connectivity and resource check, the controller program running on the computing node on which the application is composed, checks for the component programs to be launched on its node 705. The controller program launches its respective component program 710 and forwards the launch commands to other controller programs on which other component programs are to be launched 715. All the controller programs thereafter launch their respective component programs 720.

The controller program that has access to the application composed, checks whether the routing information is for its respective component program 725. In case the routing information pertains to the component program launched on its node, it adds all the routing information pertaining to its component programs in its internal routing table 730. The controller program also forwards the routing information pertaining to other component programs of an application to their respective controller programs 735. This way all the controller programs add and store the routing information pertaining to the component programs installed on their computing nodes in their internal routing tables 740.

Once the component programs are launched on their respective computing node and routing information is added to the internal routing tables of all the controller programs, the application is ready to be executed. The application is executed once any of the launched component programs receives data on their input ports. The data is processed by the component programs and sent to the next component program based on the routing information stored with the sender controller program.

Referring to FIG. 5, the two instances 526 and 528 of the "chat component program" may be specified to be launched on the same node. Launching the one-way "chat application" composed on this single node launches two running instances of the chat component program and two user interface windows pop up on the same computing node. Any text now typed into "chat component program" user interface window is relayed to "chat component program" user interface window, but not vice versa. This is because of the one-way flow of communication specified from chat component program 526 to chat component program 528 while composing the application.

Figure 8:
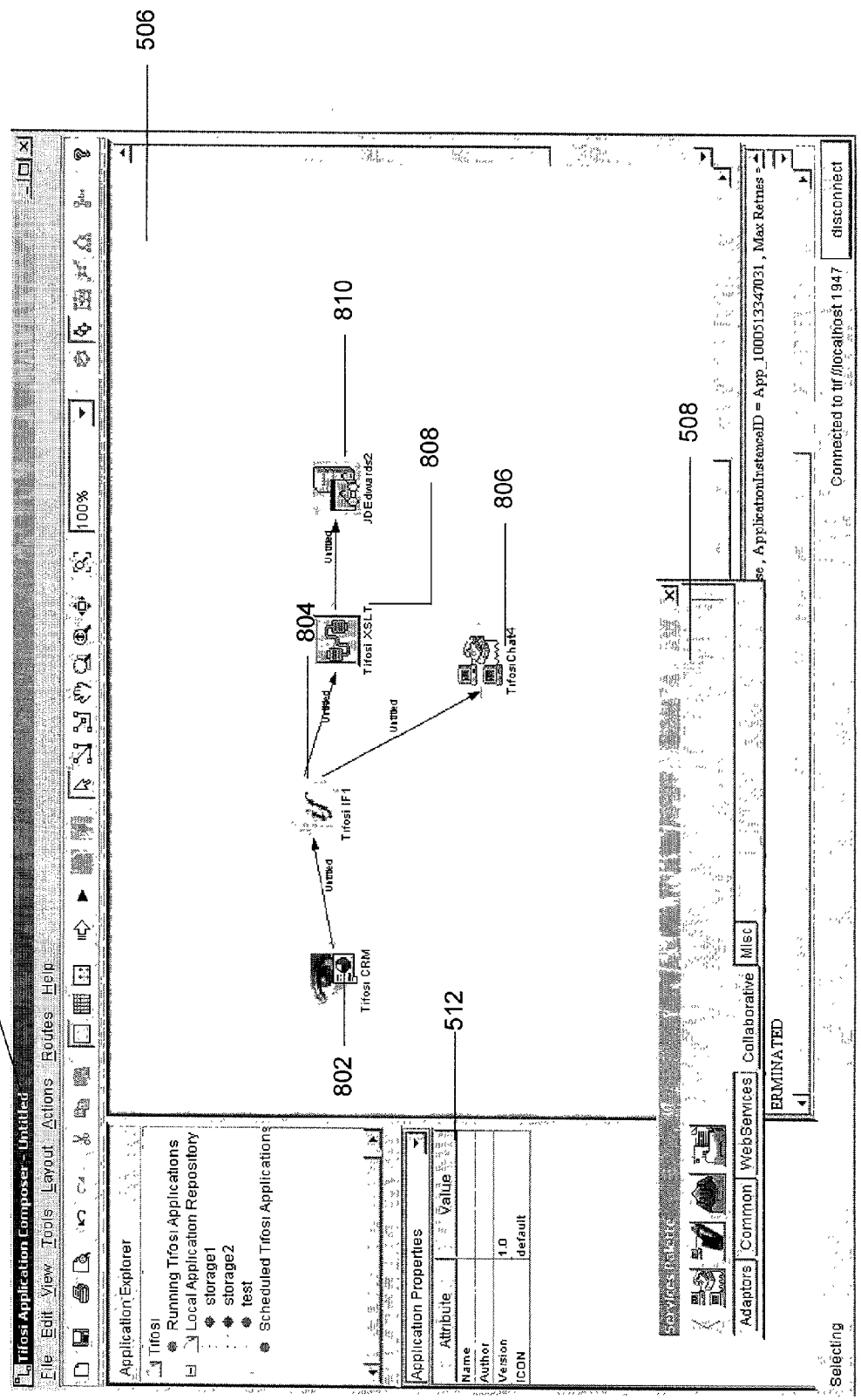
FIG. 8 is a screen shot of a window that allows a user to compose an integrated application using a GUI in accordance with a preferred embodiment of the present invention.

FIG. 8 is a screen shot of a window that allows a user to compose an integrated application in the GUI, in accordance with the preferred embodiment of the present invention. The figure also serves to illustrate a typical workflow built using the GUI. As discussed in FIG. 5, the application developer may compose all distributed applications using an "Application Composer" GUI 502. The various parts of the "Application Composer" GUI 502 have already been discussed in FIG. 5. It should be noted that the same "Application Composer" GUI 502 can also be used for integrating enterprise applications. This process of integration is illustrated using a "sales order" example.

The first step of composing the integrated application (as in a distributed application) is to choose the appropriate component programs (represented as icons) from the "Services Palette" 508. In this particular example, component programs like "CRM" 802, "JDEdwards" 810, "XSLT" 808, "IF condition" 804 and "Chat" 806 are chosen to be integrated. These component programs are enterprise applications that are already present in the "Services Palette" 508. The adapters to these enterprise applications had been previously customized and registered as component programs, to be present in the "Services Palette" 508.

To compose an integrated enterprise application, the developer drags the "CRM" 802 component program, the "XSLT" 808 component program, the "JDEdwards" 810 component program, the "chat" 806 component program and the "IF condition" 804 component program from the "Services Palette" 508 to the "Work Area" 506. The "CRM" 802 component program represents a Customer Relationship Management application. The "XSLT" 808 component program performs an Extensible style sheet Language (XSL) transformation on its input data. The specific transformation implemented by the "XSLT" 808 component program can be specified and configured in the "Tools Panel" 512 externally in the "Application Composer" GUI 502. The transformation can be specified in the data store or entered into the component program file itself via GUI 502. The "JDEdwards" 810 component program represents an Enterprise Resource Planning application. The "chat component program" 806 is a UI that takes data presented on it input port and displays it. The "IF condition" 804 component program performs a test condition on its input data and passes the same to one of its multiple distinct output ports based on the outcome of the test condition. In this way, the "IF component program" 804 is able to change the workflow depending on predefined conditions.

The arcs (message routes) connecting the output port of one component program to the input port of another component program are then drawn. In the figure, the arcs are unidirectional between all the component programs, and thus the flow of data is only one way.

The attributes of above-mentioned message route are specifiable by right clicking the appropriate arc which pops up a property window in the "Tools Panel" 512 where the application developer can specify a name for the drawn route, choose a route type (i.e. a "Point-to Point" route or a "Hub/Spoke" route), set the "Persistent" property as well as specify the "Time-To-Live" (TTL) value for the message route. All this can be done as explained previously in FIG. 5. The developer can also specify properties pertaining to the executing of the component program in the "Tools Panel" 512 by right clicking on the icon and choosing "Object properties" from the resulting menu. This pops up a property window in the "Tools Panel," 512 where one can specify the various component program properties. This has also been explained in detail in FIG. 5.

Once the integrated application has been composed and the component programs launched on their respective computing nodes, the integrated application is executed whereby the workflow is initiated once an order is received by the "CRM" 802 component program. This component program starts execution when the caller provides the necessary information specifying the order. This information is entered into the "CRM" component program 802, and then routed to the "IF condition" 804 component program. The routing happens because the semantics of the arc between the "CRM" 802 component program and the "IF component program" 804 is that the output of "CRM" 802 component program be routed to the "IF condition" 804 component program. In this example, the "IF condition" 804 component program tests whether a given purchase order (PO) order exceeds US $1000 in value. If the value of the PO is more than US$1000, it gets routed to the "chat" component program. The "chat" 806 component program has been configured to run on an administrator's terminal, and thus the administrator can manually process the order and update the corresponding database entry. On the other hand if the PO is less than US $1000, it gets routed to the "XSLT" 808 component program. The "XSLT" 808 component program performs an appropriate XSL transformation and routes the order to the "JDEdwards" 810 component program. This component program logs the information into a database and updates the accounting system to account for the new order. It may either terminate the application or further pass on the information to other applications to follow up on the original customer request. In the example shown, the "JDEdwards" 810 component program terminates the application after writing the information to the accounting database. Thus the workflow specified in the distributed application executes a set of component programs in a sequential manner.

Thus, it may be seen that no programming knowledge is required for composing integrated applications using the "Application Composer" GUI 502. Applications are composed simply by dragging and dropping component programs from the "Services Palette" 508 onto the "Work Area" 506. Further, creating arcs between the component programs representing enterprise applications easily defines the communication flow between the component programs, thus simplifying the process of composing an integrated application substantially.

Figure 9:
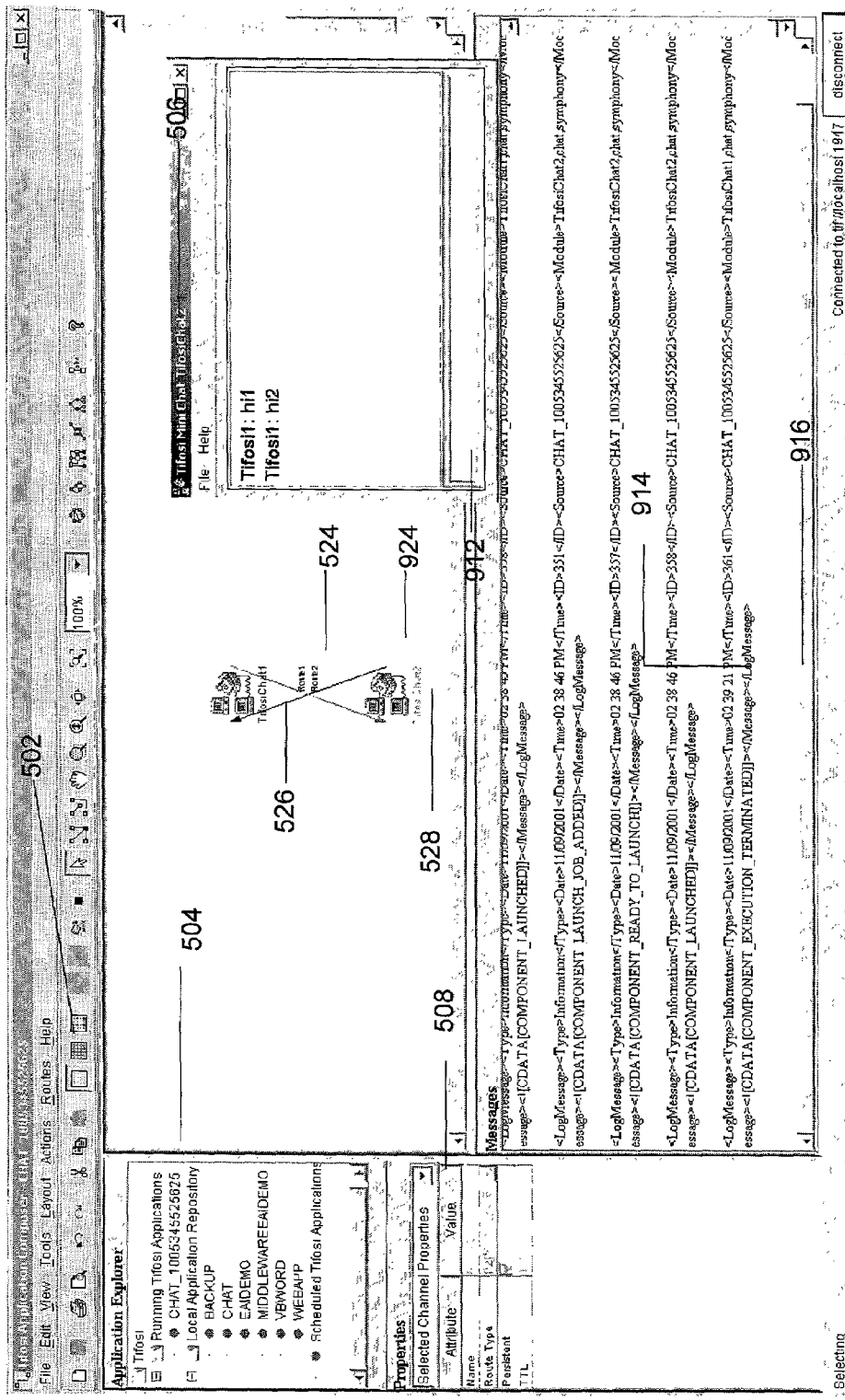
FIG. 9 is a screen shot of a window that allows a user to monitor distributed applications using a GUI in accordance with a preferred embodiment of the present invention.

FIG. 9 is a screen shot of a window that allows a user to monitor a distributed application in the GUI, in accordance with the preferred embodiment of the present invention.

The invention provides for distributed monitoring of the application(s). Each controller programs monitors the real time status of its respective running component programs. This distributed monitoring is implemented as a federated model on top of the individual monitoring implemented by the controller programs. Monitoring commands are broadcast over hub/spoke messaging to all the controller programs participating in an application, and monitoring data is gathered from all these controller programs. Thus, run time data can be gathered using any of the controller programs running on any computing node in the network. Distributed monitoring enables the controller program residing on any computing node in a network to monitor the component programs running on that computing node as well as component programs running on other computing nodes in the network.

Each controller programs maintains real time status of all component programs executing on its computing node to determine if they are active or inactive. The controller programs provide for "query based" as well as "event based" monitoring information with respect to the component programs. Thus, a particular component program may be queried for various statistical details and also for information on various events occurring within it. For instance, in case of a "CRM" component program, a controller program may query the "CRM" component program for its statistical details like the "Order-ID" of the last order, number of orders placed etc. Likewise, in case of an "IF component program," the controller program may query the component program for events occurring within the component program like "condition test passed" or "condition test failed".

The controller programs also provide for tracing and logging of information with respect to the component programs. The user can define "trace levels" of a component program, that represent the "verbosity" of the logs generated by the controller programs. The "output trace" of component programs can be updated and routed to any computing node for debugging purposes in a network. The "trace levels" can also be dynamically changed for already installed component programs running across the network.

The invention also allows developers to configure specific monitoring attributes of a component program. For example, a "CRM" component program user may need to track all the orders coming in, while a "Chat" component program user may need to track the IP address of the machine from where it receives a message. In such cases, when the call to get the monitoring statistics of a component program is made, the user-defined information along with the default monitoring information is made available to the user.

The invention further provides native support for debugging of component programs by providing the concept of "breakpoints." A breakpoint is a place in the component program where execution temporarily stops. When the debugger reaches a "breakpoint," it pauses the component program. A user can set "breakpoints" on routes between two participating component programs in an application and view the data that is being sent through the route to the target component program. This helps to verify the validity of the data being sent across. An application can have any number of "breakpoints".

Referring to FIG. 5 that shows a one-way chat application composed using "Application composer" GUI 502. This one way chat application can be made into a two way chat application by simply drawing an arc connecting the output port of component program instance 528 to the input port of component program instance 526. FIG. 9 shows the run-time monitoring and debugging of this two way chat application where an arc 924 has been drawn to connect the output port of component program instance 528 to the input port of component program instance 526.

The GUI shows the run time status of the various component programs and message routes in the "Message Panel" 914. Any run time error in the component program instance is indicated to the user as the color of the icon in the "Work Area" 506 changes. For example, the last message 916 in message panel 914 indicates that chat component program 526 has terminated. The "Application Composer" GUI 502 also lets users view the content of data that is flowing across the routes by double clicking the route. This pops up a debug window where the user can view the contents, in XML, of the active route. The GUI 502 also lets the user launch, monitor, debug and terminate applications using this GUI 502.

By default, the GUI 502 provides for monitoring of the component program instances at the various levels. A user can simply monitor the current status of the component program—i.e. whether it is "UP" or "DOWN". The user can also monitor the status of data flowing across the routes—for example, the number of messages that have flown on a route. The user is also able to monitor the name and the time at which the last message was received in input port of the component program instance as well as the amount of data received in bytes. The user can also monitor the number of messages that have been sent from the various output ports of the component program, their name and time of sending the message from the output port along with the amount of data sent out by them.

Further, as mentioned before, the user can also monitor the status of various component programs as per the attributes of the component program instances defined by the user. For instance, in case of a "CRM" component program, its monitoring statistics could return the following information: "Connected to database—Yes/No," "Order ID of last order placed," "Number of orders placed so far", etc. Further these parameters for monitoring the component programs can be changed by the user in the GUI while the component program is running.

The invention provides monitoring support not only for the component programs deployed in the invention environment, but also for monitoring of status information outside the environment. For instance, if a component program establishes a connection with a database, which is outside the invention environment, the component program developer can define an attribute that denotes the status of the connection with the database. The status of this connection with the database can also be monitored.

FIG. 9 shows the execution of the two-way "chat application". The composed application's monitoring information and all its run time messages are displayed in the run time "Message Panel" 914. This is due to the fact that controller programs auto-monitor all the running component program instances of the "chat application," and show the respective messages in the "Messages Panel". The last message 916, currently shown in this panel indicates that one of the chat component programs 526 has been terminated.

It may further be noted that in the "Application Composer" GUI, the name of component program instance 528 appears in a dark color. This is to indicate that the component program instance is active and currently running. Likewise, the name of component program instance 526 appears in a light color, which indicates that this component program instance is currently not running or has a run time error. Thus run-time errors are instantly reflected in the GUI.

In case a user double clicks on arc 924, the contents of the data flowing across the route maybe viewed. Double clicking pops up the debug window 912 where the messages passing between the two component program instances on the selected route are shown as an XML stream. This data can be forwarded to the next component program or discarded, as desired by the user.

The user can also monitor applications and component programs using external monitoring tools such as SNMP-based tools like HP OpenView.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A system for users to develop distributed applications over a network of computing units, the system comprising:

a. a plurality of component programs installed over the network of computing units to create the distributed application, wherein the only functionality of the component programs are to receive data presented at their input ports, process said data and write the results to their output ports, and wherein the component programs do not contain routing information and information related to other component programs;

b. a plurality of data stores on one or more of the computing units that contain a specification of component programs that make up the application, the communication routes between the component programs, and the nodes on which the component programs are to run;

c. a graphical user interface based application composer that composes said distributed application within said one or more data stores by allowing users to graphically specify the component programs that make up the application, the communication routes between the component programs, and the nodes on which the component programs are to run; and, d. a multiplicity of controller programs running on a multiplicity of computing units in the network for transmitting data to said input ports of the component programs and receiving data from said output ports of the component programs and for transmitting and receiving data with controller programs and disseminating said routing information to other controller programs, and wherein controller programs pass data between component programs based on the routing information disseminated to them from the data stores in which the distributed application has been composed.

2. The system as recited in claim 1 wherein the component programs are adaptors for indirectly communicating with external applications through controller programs, wherein external applications are applications that are not installed within said network of computing devices.

3. The system as recited in claim 1, wherein the data stores can be replicated for high availability on a multiplicity of computing units.

4. A method for developing distributed applications over a network of computing units, with multiple controller programs running on multiple computing units, the method comprising steps of:

a. customizing component programs;

b. registering the component programs;

c. composing said distributed application externally in a data stores wherein said distributed application is composed by using a graphical user interface based application composer that composes said distributed application within said one or more data stores by allowing users to graphically specify the component programs that make up the application, the communication routes between the component programs, and the nodes on which the component programs are to run;

d. running multiple controller programs on multiple computing units in the network for transmitting data to input ports of the component programs and receiving data from output ports of the component programs and for transmitting and receiving data with controller programs and disseminating said routing information to other controller programs;

e. receiving said transmitted data at the input ports of the component programs, processing said data within said component programs and writing the results to the output ports of the component programs; and f. optionally checking the connectivity and resources on multiple controller programs running on multiple computing units;

g. executing the distributed application.

5. The method as claimed in claim 4, wherein the registering comprises the steps of:

a. installing component programs on the computing units;

b. specifying the external resources required by the component programs;

c. specifying the input and output channels of the component programs; and d. making the component programs accessible to said computing units.

6. The method as claimed in claim 4, wherein composing the distributed application comprises the steps of:

a. choosing a subset of component programs from a set of component programs;

b. adding and specifying the routes between the component programs;

c. specifying the computing units on which the component programs are to be run;

d. defining run time attributes of the component programs;

e. defining various attributes of the routes; and f. storing the composed distributed application in data stores.

7. The method as claimed in claim 6 wherein the defining attributes of the routes comprises defining the route type as peer-to-peer.

8. The method as claimed in claim 4, wherein the checking the connectivity and resources comprises steps of:

a. checking if all controller programs are already running on the computing units in the network;

b. checking if all the component programs are installed on the computing units on which they are specified to launch; and c. installing the component programs on the computing units in case they are not already installed.

9. The method as claimed in claim 4, wherein executing the distributed application, comprises the steps of:

a. receiving of data for the component programs by controller programs;

b. collection of data by the appropriate component program from the controller programs;

c. processing of data by the component programs;

d. receiving of processed data from the component programs by the controller programs; and e. transmitting the data to a plurality of next controller programs based on the routing information stored in the routing table by the controller program interacting with it.

10. The method as recited in claim 9, wherein the passing of the processed data to the plurality of next component programs based on the routing information stored in the routing table by the controller program comprises steps of:

a. tagging the processed data with the name of the destination component programs;

b. placing the data processed by the controller program in the message bus for the controller program on whose node the destination component is installed for fetching, where the routing table specifies a hub/spoke route type; and c. sending the data processed by the controller program directly to the controller program on whose computing unit the destination component programs are installed, where the routing table specifies a peer to peer route type.

* * * * *